June 9, 1953     L. VAN DER PLATE     2,641,223
CONTROL MECHANISM FOR MILKING SYSTEMS
Filed June 7, 1951     2 Sheets-Sheet 1
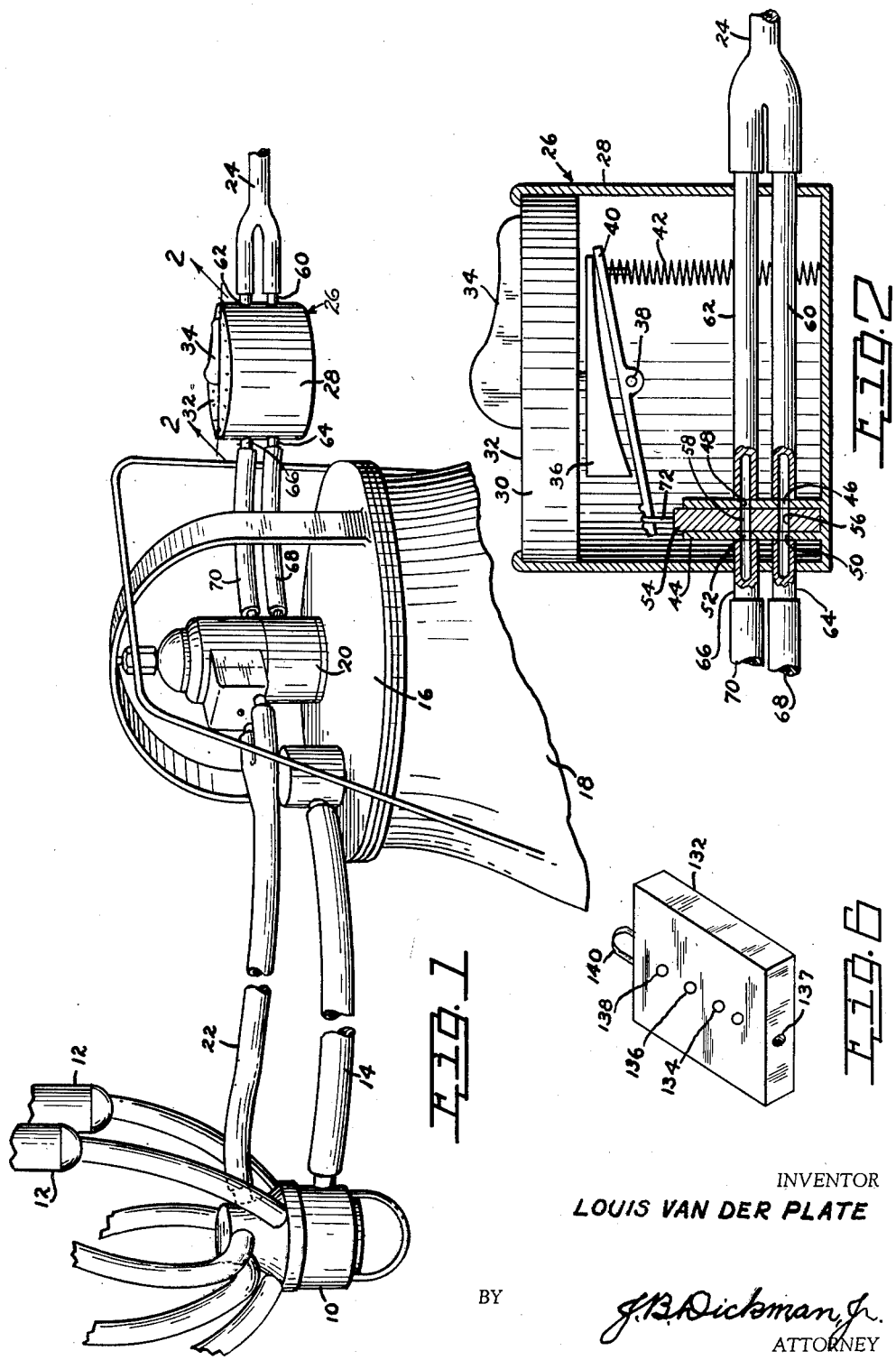
INVENTOR
LOUIS VAN DER PLATE
BY
J. B. Dickman, Jr.
ATTORNEY June 9, 1953 L. VAN DER PLATE 2,641,223
CONTROL MECHANISM FOR MILKING SYSTEMS
Filed June 7, 1951 2 Sheets-Sheet 2
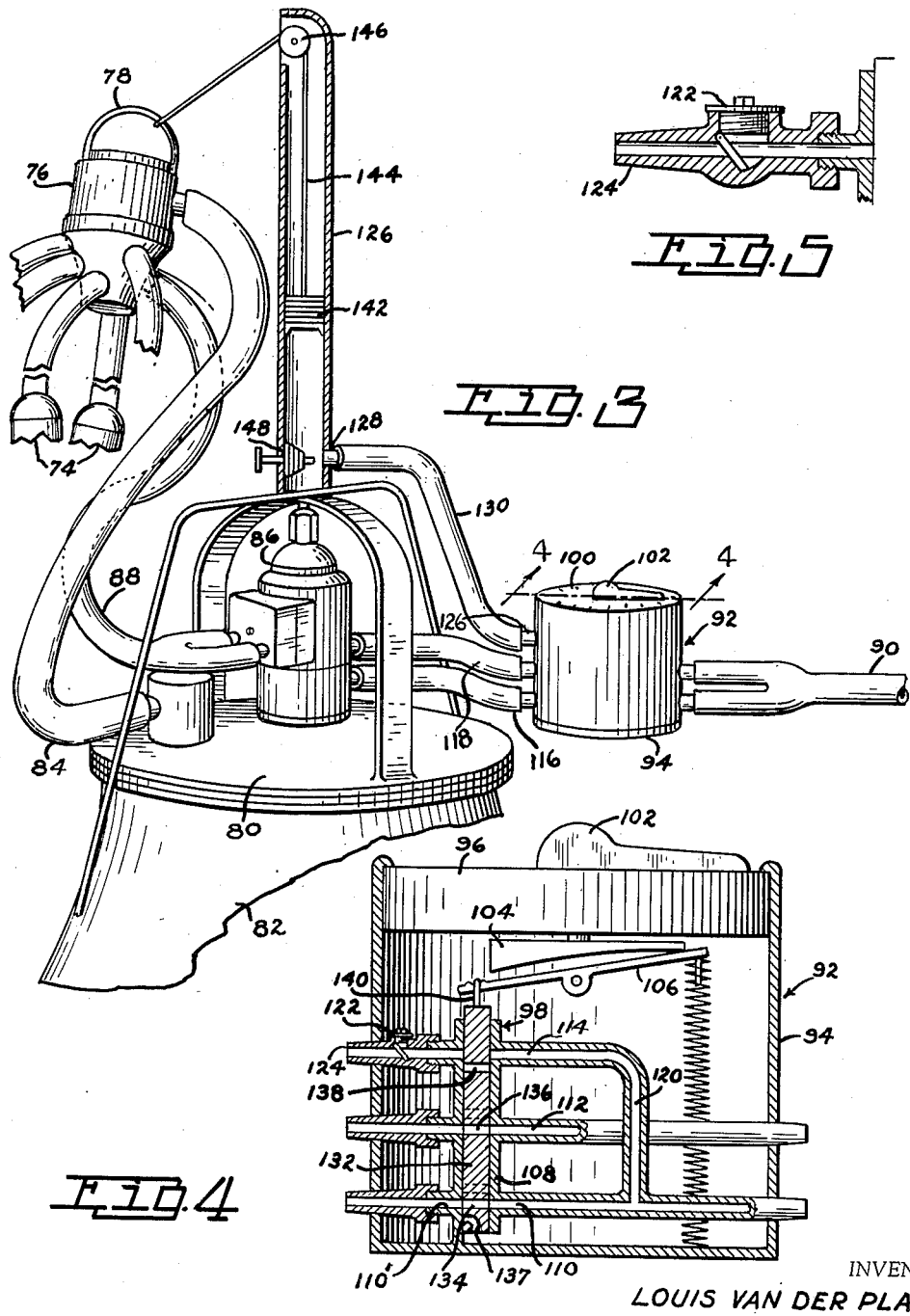
INVENTOR
LOUIS VAN DER PLATE
BY
J. B. Dickman, Jr.
ATTORNEY Patented June 9, 1953

2,641,223

UNITED STATES PATENT OFFICE 2,641,223

CONTROL MECHANISM FOR MILKING SYSTEMS

Louis Van der Plate, Paterson, N. J.

Application June 7, 1951, Serial No. 230,354

3 Claims. (Cl. 119—14.14)

1

The present invention relates to a milking system and more particularly to a system of the type which employs teat cups which are connected to a vacuum line through a pulsator which is mounted atop a milker pail.

The primary object of the present invention is to interrupt the vacuum through the pulsator and the teat cups at the expiration of a predetermined length of time, the time period being regulable by an attendant.

Another object of the present invention is to support the teat cups clear of the floor when the vacuum is interrupted and to thus preserve their uncontaminated condition.

The above and other objects may be attained by employing this invention which embodies among its features a time controlled valve mounted in the vacuum line of a conventional milking system between the vacuum source and the pulsator for interrupting the vacuum through the pulsator and teat cups at the expiration of a predetermined period of time.

Other features include, a cylinder mounted atop the milker pail, a piston working in the cylinder, a duct connected to the cylinder behind the piston and to the valve for establishing communication between the cylinder and the vacuum source when communication between the vacuum source and the pulsator is interrupted and a cable connected to the piston and to the teat cups so that when the teat cups fall from the cow's udder owing to the interruption of the vacuum, they will be suspended by the cable clear of the floor.

Still other features include a check valve in the duct to prevent the inflow of air into the cylinder through the vacuum line when the latter is disconnected from the vacuum creating source, and a manually actuated valve carried by the cylinder behind the piston for admitting air to said cylinder.

Other and more specific objects of the present invention will become apparent in the following detailed description of a preferred form of the device constructed in accordance therewith, having reference to the accompanying drawing, wherein:

Figure 1 is a fragmentary perspective view of one type of milking system showing my time controlled valve connected therein.

Figure 2 is an enlarged vertical sectional view taken on line 2—2 of Figure 1 through the valve showing in full lines the parts in normal position during the milking operation and in broken lines the position of the parts when the time clock has moved them to interrupt the vacuum through the system.

2

Figure 3 is a fragmentary view similar to Figure 1 showing a modified form of the invention applied to another type of milking system.

Figure 4 is an enlarged vertical sectional view through the valve taken on line 4—4 of Figure 3, Figure 5 is an enlarged sectional view of the check valve, and Figure 6 is a perspective view of a valve slide.

Referring to the drawings in detail one type of milking system to which the invention relates includes a conventional claw 10 to which a group of conventional teat cups 12 is connected in a conventional manner. A milk conveying line 14 leads from the claw 10 to the cover 16 of a milker pail 18 through which milk extracted from the udder of a cow enters the milker pail in a conventional manner. Also carried by the cover 16 is a conventional pulsator 20, one side of which is connected through a tube 22 to the claw 10. This tube 20 forms a part of the vacuum line of the milking system. The opposite side of the pulsator 20 is normally connected through a tube 24 to a conventional vacuum pump (not shown) of the type commonly employed in a conventional milking system. The tubes 22 and 24 constitute a vacuum line connected at one end to the vacuum pump and at its opposite end to the teat cups 12 with the pulsator 20 interposed therein.

All of the structure so far described is common to a conventional milking system and except in combination with my improved timing means forms no part of this invention.

Individual cows will differ as to the time required for milking and accordingly an attendant must watch the milking of each cow to see that the milking is stopped at the proper instant. In order to free an attendant for other duties I introduce into the vacuum line between the tube 24 and the pulsator a time controlled valve designated generally 26. This time controlled valve 26 comprises a casing 28, housing at one end of a clockwork mechanism 30 having an exposed dial 32 over which a manually actuated hand 34 operates. This hand is so connected with the clockwork that it may be manually set to an index on the dial and when freed will work its way back to zero. A cam 36 is connected to the clockwork 30 and operates within the housing so that when the hand 34 is at zero the high side of the cam will be directly beneath the zero mark. Rockably mounted on a transverse shaft 38 within the casing 28 is a lever 40 adjacent one end of which is engaged one end of a compression coiled spring 42, the opposite end of which bears on the bottom of the casing so as to urge the lever 40 to rock about the pivot 38 and yieldingly hold one end of the lever against the under side of the cam 36. It will thus be seen that as the clockwork 30 drives the cam 36, the lever 40 will be rocked about the pivot 38.

Mounted within the casing 28 is a valve body 44 having ports 46, 48, 50 and 52 extending therethrough. The ports 46 and 50 align with one another and the ports 48 and 52 align with one another, and mounted for sliding movement within the valve body 44 is a slide 54 having ports 56 and 58 therein. As shown in Figure 2 the port 56 and the port 58 establish communication between the ports 46 and 50, and 48 and 52 respectively when the slide is down but when the slide is elevated such communication is interrupted. Nipples 60 and 62 extend through the casing 28 and are connected to the tube 24 and oppositely extending nipples 64 and 66 extend through the casing 28 and are connected by way of tubes 68 and 70 to the pulsator 20. It will thus be seen that when the slide 54 is elevated the vacuum through the line will be interrupted between the pulsator 20 and the vacuum pump. A link 72 is carried by the upper end of the slide 54 and is coupled to the lever 40 adjacent the end thereof remote from the spring 42 so that when the lever 40 is rocked by the cam 36 the valve will be closed.

In the modified form of the invention illustrated in Figures 3 and 4 a group of teat cups 74 is connected in a conventional manner to a claw 76 having a bail 78 attached thereto. The teat cups 74 are connected to the cover 80 of a conventional milker pail 82 by a tube 84 through which the milk extracted by the action of the milker is delivered to the milker pail 82. A conventional pulsator 86 is carried by the cover 80 and is connected by a tube 88 to the teat cups 74 through the claw 76. This tube 88 forms a section of the conventional vacuum line of the milker. A similar tube 90 is connected at one end to a conventional vacuum pump (not shown) and under ordinary circumstances to the side of the pulsator 86 opposite that to which the tube 88 is connected, and this tube 90 in cooperation with the pulsator 86 and the tube 88 forms the vacuum line of a conventional milking system.

In order to arrest the operation of the milker at the expiration of a predetermined period of time, I interpose in the vacuum line between the pulsator 86 and the vacuum pump a timer designated generally 92. This timer comprises a casing 94 in which is housed a clockwork 96 and a valve designated generally 98. The clockwork 96 is provided with a dial 100 which is exposed through the casing 94 and over which is rotatable a hand 102 which also serves as the winding and time indicating means.

Carried by the clockwork 96 within the casing 94 is a cam 104 and rockably mounted within the casing is a rock arm 106, one end of which is engaged by the cam 104 so that when the latter is rotated the arm 106 will be rocked. The valve 98 comprises a casing 108 having aligning parts 110, 110′, 112 and 114 therein. The ports 110 and 112 on one side of the casing 108 are connected through pipes 116 and 118 to the side of the pulsator 86 opposite the tube 88. The ports 110 and 112 on the opposite side of the casing 108 are connected to the tube 90 so that the valve 98 will be interposed in the vacuum line between the pulsator 86 and the pump. Connecting the ports 110 and 114 on the side of the casing 108 adjacent the tube 90 is a duct 120 and communicating with the port 114 on the side of the casing 108 remote from the duct 120 is a check valve 122 carrying a nipple 124 for a purpose to be more fully hereinafter described.

Mounted on the milker pail 82 is an upwardly extending cylinder 126 having a port 128 adjacent its lower end which communicates through a tube 130 with the check valve 122. A slide 132 is mounted within the valve casing 108 and is provided with longitudinally spaced ports 134, 136 and 138 which are so distributed that when the slide is in its innermost position the ports 134 and 136 register with the ports 110 and 112 respectively while the port 138 is out of register with the port 114. A link 140 is carried by the slide 132 and is connected to the lever 106 so that when it is moved under the influence of the cam 104, the slide 132 will move to bring the port 138 in register with the port 114 and the ports 134 and 136 out of register with the ports 110 and 112. The slide 132 is also provided adjacent its end remote from its connection to the link 140 with an L-shaped passage 137 one leg of which opens through the side of the slide 132 for registration with the port 110′ when the slide 132 is elevated so that the ports 134 and 136 are out of alignment with the ports 112, 110′ and the port 138 aligns with the ports 114. The opposite leg of the L-shaped passage 137 opens outwardly through a side or the bottom edge of the slide so as to establish communication of the port 110′ with atmosphere.

A piston 142 is mounted in the cylinder 126 for reciprocal motion therein and connected to the piston 142 and extending upwardly in the cylinder 126 through the upper end thereof is a cable 144 which is trained over a pulley 146 mounted in the upper end of the cylinder. This cable 144 is connected at its end remote from the piston to the bail 78 of the claw 76. It will thus be seen that when the portion of the cylinder 126 behind the piston is evacuated, pull will be exerted on the cable 144 to elevate the claw 76 and lift the teat cups 74 clear of the floor. A spring closed manually actuated relief valve 148 is connected to the cylinder 126 opposite the port 128 so as to enable an attendant to admit air to the cylinder 126 and permit the piston 142 to move upwardly therein.

In use the timer 26 is connected in the vacuum line of a conventional milking system between the pulsator 20 and the vacuum pump. With the hand or pointer 34 turned to a selected index on the dial 32, the clockwork 30 will start to run and move the cam 36. As the end of the period of time is approached, the cam 36 will engage the lever 40 and rock it to elevate the slide 54 so as to move the ports 56 and 58 out of register with the ports 46 and 50 and the ports 48 and 52 thus interrupting the vacuum through the pulsator 20 and the teat cups 12. This will release the teat cups 12 from the cow's udder and permit them to hang by the tubes 14 and 22. In this type of device the claw 10 and teat cups 12 are suspended on the tubes 14 and 22 clear of the floor.

In some types of milkers it is necessary to support the teat cups and claw clear of the floor after the teat cups are freed from the udder and in this type of milker, I employ a timer 92 and cylinder 126. The timer 92 is connected into the vacuum line between the pulsator 86 and the vacuum pump and operates to shift the slide 132 at the expiration of a predetermined period of time so that the ports 134 and 136 will move out of register with the ports 110 and 112. This interrupts the vacuum through the pulsator 86 and simultaneously opens the teat cup line to atmosphere through the L-shaped passage 137. This disengages the teat cups 74 from the cow's udder so that the latter will fall. In order to suspend the teat cups clear of the floor, the port 138 moves into register with the port 114 and creates a vacuum behind the piston 142 in the cylinder 126 so as to exert pull on the cable 144 and suspend the teat cups 74 clear of the floor. The teat cups 74 are so held by the closing of the check valve 122 until air is again admitted to the cylinder through the manually actuated relief valve 148. Thus the teat cups 74 may be freed for attachment to the udder of the next cow to be milked.

I wish to have it understood that minor changes in detail and construction of the various parts may be made without departing from the spirit of the invention, the scope of which is set forth in the appended claims.

What is claimed is:

1. In a milking system having a pulsator, teat cups, a vacuum line connected to the teat cups and to the pulsator, and means connected to the vacuum line for creating a vacuum therein, means for interrupting the vacuum to the pulsator and to the teat cups at the expiration of a predetermined period of time comprising a time actuated valve connected in the vacuum line between the pulsator and the vacuum creating means, a cylinder mounted adjacent said valve, a piston working within the cylinder, means establishing communication between the cylinder behind the piston and the valve for moving said piston when the valve interrupts the vacuum through the pulsator, and means connected to the piston and to the teat cups for supporting said teat cups when the vacuum is interrupted.

2. In a milking system having a pulsator, teat cups, a vacuum line connected to the teat cups and to the pulsator, and means connected to the vacuum line for creating a vacuum therein, means for interrupting the vacuum to the pulsator and to the teat cups at the expiration of a predetermined period of time and for supporting the teat cups when the vacuum therein is discontinued comprising, a time controlled valve mounted in the vacuum line between the pulsator and the vacuum creating means, said valve having ports therein which establish communication between the vacuum creating means and the pulsator and for opening the teat cups to atmosphere, a cylinder mounted adjacent the valve, a piston working in said cylinder, a duct connected to the cylinder behind the piston and to the valve, a port in the valve for establishing communication between the cylinder and the vacuum creating means when the vacuum to the pulsator and the teat cups is interrupted, and means connected to the piston and to the teat cups for supporting said teat cups when the vacuum thereto is interrupted.

3. In a milking system having a pulsator, teat cups, a vacuum line connected to the teat cups and to the pulsator, and means connected to the vacuum line for creating a vacuum therein, means for interrupting the vacuum to the pulsator and teat cups at the expiration of a predetermined period of time for supporting the teat cups when the vacuum therein is discontinued comprising, a time controlled valve mounted in the vacuum line between the pulsator and the vacuum creating means, said valve having ports therein which establish communication between the vacuum creating means and the pulsator and for opening the teat cups to atmosphere, a cylinder mounted adjacent the valve, a piston working in said cylinder, a duct connected to the cylinder behind the piston and to the valve, a port in the valve for establishing communication between the cylinder and the vacuum creating means when the vacuum to the pulsator and teat cups is interrupted, and means connected to the piston and to the teat cups for supporting said teat cups when the vacuum thereto is interrupted, a check valve in the duct between the cylinder and the valve for maintaining a vacuum within the cylinder, and a manually actuated relief valve in the cylinder behind the piston for admitting air to said cylinder.

LOUIS VAN DER PLATE.

References Cited in the file of this patent

UNITED STATES PATENTS

| Number | Name | Date |
|---|---|---|
| D. 134,759 | Gengler | Jan. 5, 1943 |
| 514,551 | Hussey et al. | Feb. 13, 1894 |
| 719,443 | Devore | Feb. 3, 1903 |
| 1,164,256 | Cameron | Dec. 14, 1915 |
| 2,416,139 | Babson | Feb. 18, 1947 |
| 2,488,754 | Willson | Nov. 22, 1949 |
| 2,534,927 | Schilling | Dec. 19, 1950 |